(12) United States Patent
Canpolat et al.

(10) Patent No.: US 8,831,149 B2
(45) Date of Patent: Sep. 9, 2014

(54) SYMBOL ESTIMATION METHODS AND APPARATUSES

(75) Inventors: Bahadir Canpolat, Farnborough (GB); Farrokh Abrishamkar, San Diego, CA (US); Divaydeep Sikri, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 986 days.

(21) Appl. No.: 12/553,855

(22) Filed: Sep. 3, 2009

(65) Prior Publication Data

US 2011/0051859 A1     Mar. 3, 2011

(51) Int. Cl.
*H04L 27/06*     (2006.01)
*H04L 25/03*     (2006.01)

(52) U.S. Cl.
CPC ...... *H04L 25/03178* (2013.01); *H04L 25/0328* (2013.01)
USPC .......................................................... 375/341

(58) Field of Classification Search
USPC .......................................................... 375/341
See application file for complete search history.

(56) References Cited

U.S. PATENT DOCUMENTS

| | | | |
|---|---|---|---|
| 4,718,066 A | 1/1988 | Rogard | |
| 4,885,744 A | 12/1989 | Lespagnol et al. | |
| 5,267,249 A | 11/1993 | Dong | |
| 5,710,784 A | 1/1998 | Kindred et al. | |
| 5,751,725 A | 5/1998 | Chen | |
| 5,774,450 A | 6/1998 | Harada et al. | |
| 5,774,496 A | 6/1998 | Butler et al. | |
| 5,887,035 A * | 3/1999 | Molnar | 375/340 |
| 5,960,361 A | 9/1999 | Chen | |
| 5,983,383 A | 11/1999 | Wolf | |
| 6,108,373 A | 8/2000 | Fargues et al. | |
| 6,169,759 B1 | 1/2001 | Kanterakis et al. | |

(Continued)

FOREIGN PATENT DOCUMENTS

| | | |
|---|---|---|
| CN | 1207835 A | 2/1999 |
| CN | 1250269 A | 4/2000 |

(Continued)

OTHER PUBLICATIONS

3GPP Draft; 25.814-V1.5.0, 3rd Generation Partnership Project (3GPP), Mobile Competence Centre ; 650, Route Des Lucioles ; F-06921 Sophia-Antipolis Cedex ; France, vol. RAN WG1, No. Shanghai, China; 20060526, May 26, 2006, XP050102001 pp. 29-30 p. 76 pp. 89-90.

(Continued)

*Primary Examiner* — Tanmay Shah
(74) *Attorney, Agent, or Firm* — S. Hossain Beladi

(57) ABSTRACT

A novel symbol estimation method produces intersymbol interference free symbols by detecting interfering symbols in an interfering channel. A channel estimate is refined for additional improvements. The method can lends itself as a serial or parallel algorithm implementation. The symbol estimation method includes using an initial estimate of received symbols and calculating a refined estimate of the received symbols using a channel estimate. The refined estimate is calculated by performing parameterization of intersymbol interference by symbols other than the symbol being refined and selecting a refined value for the symbol being refined by evaluating an optimization function. Symbol estimates are refined in multiple iterations, until a predetermined iteration termination criterion is met. Parameterization of ISI contribution of other symbols results in reduced computation by reducing total number of unknown variables in the refinement operation.

48 Claims, 12 Drawing Sheets

(56) References Cited

U.S. PATENT DOCUMENTS

| | | |
|---|---|---|
| 6,208,699 B1 | 3/2001 | Chen et al. |
| 6,259,730 B1 | 7/2001 | Solondz |
| 6,282,233 B1 | 8/2001 | Yoshida |
| 6,285,682 B1 | 9/2001 | Proctor et al. |
| 6,396,867 B1 | 5/2002 | Tiedemann, Jr. et al. |
| 6,480,558 B1 | 11/2002 | Ottosson et al. |
| 6,496,706 B1 | 12/2002 | Jou et al. |
| 6,532,254 B1 | 3/2003 | Jokinen |
| 6,545,989 B1 | 4/2003 | Butler |
| 6,553,224 B1 | 4/2003 | Kim |
| 6,587,522 B1 | 7/2003 | Wheeler et al. |
| 6,590,881 B1 | 7/2003 | Wallace et al. |
| 6,615,030 B1 | 9/2003 | Saito et al. |
| 6,628,707 B2 | 9/2003 | Rafie et al. |
| 6,633,601 B1 | 10/2003 | Yang |
| 6,741,661 B2 | 5/2004 | Wheatley, III et al. |
| 6,744,814 B1 | 6/2004 | Blanksby et al. |
| 6,747,963 B1 | 6/2004 | Park et al. |
| 6,765,531 B2 | 7/2004 | Anderson |
| 6,765,894 B1 | 7/2004 | Hayashi |
| 6,771,689 B2 | 8/2004 | Solondz |
| 6,771,934 B2 | 8/2004 | Demers et al. |
| 6,834,197 B2 | 12/2004 | Nakahara et al. |
| 6,907,092 B1 | 6/2005 | Yakhnich et al. |
| 6,917,607 B1 | 7/2005 | Yeom et al. |
| 6,931,030 B1 | 8/2005 | Dogan |
| 6,956,893 B2 | 10/2005 | Frank et al. |
| 6,959,010 B1 | 10/2005 | Bahrenburg et al. |
| 6,975,604 B1 | 12/2005 | Ishida et al. |
| 6,977,888 B1 | 12/2005 | Frenger et al. |
| 6,983,166 B2 | 1/2006 | Shiu et al. |
| 6,985,516 B1 | 1/2006 | Easton et al. |
| 7,006,439 B2 | 2/2006 | Thron et al. |
| 7,006,795 B2 | 2/2006 | Foschini et al. |
| 7,013,147 B1 | 3/2006 | Kuwahara et al. |
| 7,023,880 B2 | 4/2006 | El-Maleh et al. |
| 7,031,742 B2 | 4/2006 | Chen et al. |
| 7,042,869 B1 | 5/2006 | Bender |
| 7,107,031 B2 | 9/2006 | Kristensson et al. |
| 7,116,735 B2 | 10/2006 | Yamada et al. |
| 7,123,590 B2 | 10/2006 | Mir et al. |
| 7,130,365 B2 | 10/2006 | Li |
| 7,167,502 B1 | 1/2007 | Tsaur |
| 7,187,736 B2 | 3/2007 | Buckley et al. |
| 7,200,172 B2 | 4/2007 | Pukkila et al. |
| 7,224,962 B1 | 5/2007 | Kite |
| 7,295,636 B2 | 11/2007 | Onggosanusi et al. |
| 7,298,806 B1 | 11/2007 | Varma et al. |
| 7,302,009 B2 | 11/2007 | Walton et al. |
| 7,308,056 B2 | 12/2007 | Pukkila et al. |
| 7,313,189 B2 | 12/2007 | Yoshida et al. |
| 7,349,379 B2 | 3/2008 | Schmidl et al. |
| 7,406,065 B2 | 7/2008 | Willenegger et al. |
| 7,466,666 B2 | 12/2008 | Yoon et al. |
| 7,613,144 B2 | 11/2009 | Malladi et al. |
| 7,620,662 B2 | 11/2009 | Kassai et al. |
| 7,630,321 B2 | 12/2009 | Jain et al. |
| 7,693,210 B2 | 4/2010 | Margetts et al. |
| 7,706,430 B2 | 4/2010 | Guo et al. |
| 7,724,701 B2 | 5/2010 | Lundby et al. |
| 7,764,726 B2 | 7/2010 | Simic et al. |
| 7,783,312 B2 | 8/2010 | Mudigonda et al. |
| 7,933,256 B2 | 4/2011 | Abrishamkar et al. |
| 8,160,002 B2 | 4/2012 | Rajkotia et al. |
| 8,396,440 B2 | 3/2013 | Canpolat et al. |
| 8,422,955 B2 | 4/2013 | Smee et al. |
| 8,442,441 B2 | 5/2013 | Pfister et al. |
| 8,489,128 B2 | 7/2013 | Lundby |
| 8,594,252 B2 | 11/2013 | Black et al. |
| 8,611,305 B2 | 12/2013 | Black et al. |
| 8,630,602 B2 | 1/2014 | Attar et al. |
| 2001/0018650 A1 | 8/2001 | DeJaco |
| 2001/0021229 A1 | 9/2001 | Belaiche |
| 2002/0006138 A1 | 1/2002 | Odenwalder |
| 2002/0046379 A1 | 4/2002 | Miki et al. |
| 2002/0071407 A1 | 6/2002 | Koo et al. |
| 2002/0093937 A1 | 7/2002 | Kim et al. |
| 2002/0131381 A1 | 9/2002 | Kim et al. |
| 2002/0131532 A1 | 9/2002 | Chi et al. |
| 2002/0132625 A1 | 9/2002 | Ogino et al. |
| 2002/0181557 A1 | 12/2002 | Fujii |
| 2003/0004784 A1 | 1/2003 | Li et al. |
| 2003/0041206 A1 | 2/2003 | Dickie |
| 2003/0103470 A1 | 6/2003 | Yafuso |
| 2003/0112370 A1 | 6/2003 | Long et al. |
| 2003/0119451 A1 | 6/2003 | Jang et al. |
| 2003/0125037 A1 | 7/2003 | Bae et al. |
| 2003/0134656 A1 | 7/2003 | Chang et al. |
| 2003/0147476 A1 | 8/2003 | Ma et al. |
| 2003/0199290 A1 | 10/2003 | Viertola |
| 2003/0212816 A1 | 11/2003 | Bender et al. |
| 2003/0223396 A1 | 12/2003 | Tsai et al. |
| 2004/0001563 A1 | 1/2004 | Scarpa |
| 2004/0005897 A1 | 1/2004 | Tomoe et al. |
| 2004/0017311 A1 | 1/2004 | Thomas et al. |
| 2004/0043746 A1 | 3/2004 | Hiramatsu |
| 2004/0062302 A1 | 4/2004 | Fujii et al. |
| 2004/0081124 A1 | 4/2004 | Black et al. |
| 2004/0081248 A1 | 4/2004 | Parolari |
| 2004/0082356 A1 | 4/2004 | Walton et al. |
| 2004/0085917 A1 | 5/2004 | Fitton et al. |
| 2004/0085936 A1 | 5/2004 | Gopalakrishnan et al. |
| 2004/0116122 A1 | 6/2004 | Zeira et al. |
| 2004/0131007 A1 | 7/2004 | Smee et al. |
| 2004/0141525 A1 | 7/2004 | Bhushan et al. |
| 2004/0157614 A1 | 8/2004 | Fujita et al. |
| 2004/0160933 A1 | 8/2004 | Odenwalder et al. |
| 2004/0168113 A1 | 8/2004 | Murata et al. |
| 2004/0185868 A1 | 9/2004 | Jain et al. |
| 2004/0198404 A1 | 10/2004 | Attar et al. |
| 2004/0203913 A1 | 10/2004 | Ogino et al. |
| 2004/0223507 A1 | 11/2004 | Kuchibhotla et al. |
| 2004/0223538 A1 | 11/2004 | Zeira |
| 2004/0229615 A1 | 11/2004 | Agrawal |
| 2004/0240400 A1 | 12/2004 | Khan |
| 2004/0240416 A1 | 12/2004 | Derryberry et al. |
| 2005/0013263 A1 | 1/2005 | Kim et al. |
| 2005/0018614 A1 | 1/2005 | Kiran |
| 2005/0037718 A1 | 2/2005 | Kim et al. |
| 2005/0053088 A1 | 3/2005 | Cheng et al. |
| 2005/0058154 A1 | 3/2005 | Lee et al. |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0153695 A1 | 7/2005 | Cho |
| 2005/0185364 A1 | 8/2005 | Bell et al. |
| 2005/0232174 A1 | 10/2005 | Onggosanusi et al. |
| 2005/0249163 A1 | 11/2005 | Kim et al. |
| 2005/0265399 A1 | 12/2005 | El-Maleh et al. |
| 2005/0265465 A1 | 12/2005 | Hosur et al. |
| 2005/0277429 A1 | 12/2005 | Laroia et al. |
| 2006/0050666 A1 | 3/2006 | Odenwalder |
| 2006/0109938 A1 | 5/2006 | Challa et al. |
| 2006/0126765 A1 | 6/2006 | Shin et al. |
| 2006/0126844 A1 | 6/2006 | Mauro |
| 2006/0141935 A1 | 6/2006 | Hou et al. |
| 2006/0142038 A1 | 6/2006 | Ozarow et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209783 A1 | 9/2006 | Jain et al. |
| 2006/0209902 A1 | 9/2006 | Grilli et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0021148 A1 | 1/2007 | Mahini |
| 2007/0040704 A1 | 2/2007 | Smee et al. |
| 2007/0050189 A1 | 3/2007 | Cruz-Zeno et al. |
| 2007/0058709 A1 | 3/2007 | Chen et al. |
| 2007/0063897 A1 | 3/2007 | Matsuda |
| 2007/0071145 A1 | 3/2007 | Perets |
| 2007/0086513 A1 | 4/2007 | Fernandez-Corbaton et al. |
| 2007/0110095 A1 | 5/2007 | Attar et al. |
| 2007/0112564 A1 | 5/2007 | Jelinek |

(56) References Cited

U.S. PATENT DOCUMENTS

| | | |
|---|---|---|
| 2007/0121554 A1 | 5/2007 | Luo et al. |
| 2007/0121764 A1 | 5/2007 | Chen et al. |
| 2007/0127608 A1 | 6/2007 | Scheim et al. |
| 2007/0133423 A1 | 6/2007 | Okumura |
| 2007/0133475 A1 | 6/2007 | Peisa et al. |
| 2007/0150787 A1 | 6/2007 | Kim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0109907 A1 | 4/2009 | Tsai et al. |
| 2009/0207944 A1 | 8/2009 | Furman et al. |
| 2009/0232052 A1 | 9/2009 | Black et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1* | 3/2010 | Tang ............................ 370/335 |
| 2010/0097955 A1 | 4/2010 | Jou |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051864 A1 | 3/2011 | Chalia et al. |
| 2011/0264976 A1 | 10/2011 | Yang et al. |
| 2011/0305303 A1 | 12/2011 | Sikri et al. |
| 2012/0243515 A1 | 9/2012 | Xue et al. |
| 2012/0281675 A1 | 11/2012 | Liang et al. |

FOREIGN PATENT DOCUMENTS

| | | |
|---|---|---|
| CN | 1278382 A | 12/2000 |
| CN | 1304589 A | 7/2001 |
| CN | 1394407 A | 1/2003 |
| CN | 1447549 A | 10/2003 |
| CN | 1497857 A | 5/2004 |
| CN | 1552133 A | 12/2004 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101103279 A | 1/2008 |
| CN | 101120514 A | 2/2008 |
| CN | 101189901 A | 5/2008 |
| CN | 101366305 A | 2/2009 |
| CN | 101465689 A | 6/2009 |
| CN | 101483499 A | 7/2009 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 A | 10/2004 |
| JP | 2004343754 A | 12/2004 |
| JP | 2005065197 A | 3/2005 |
| JP | 2005160940 A | 4/2005 |
| JP | 2006503485 A | 1/2006 |
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2008053889 A | 3/2008 |
| JP | 2008199493 A | 8/2008 |
| JP | 2008278338 A | 11/2008 |
| JP | 2008539664 A | 11/2008 |
| JP | 2009545219 A | 12/2009 |
| JP | 2011524115 A | 8/2011 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20050073113 A | 7/2005 |
| KR | 1020050097552 A | 10/2005 |
| KR | 20070091214 A | 9/2007 |
| KR | 20070104633 A | 10/2007 |
| KR | 20080039772 A | 5/2008 |
| RU | 2211531 C2 | 8/2003 |
| RU | 2233033 C2 | 7/2004 |

(56) References Cited

FOREIGN PATENT DOCUMENTS

| | | |
|---|---|---|
| RU | 2233045 C2 | 7/2004 |
| RU | 2280329 C1 | 7/2006 |
| RU | 2301493 | 6/2007 |
| RU | 2319307 C2 | 3/2008 |
| RU | 2323529 C2 | 4/2008 |
| TW | 365717 | 8/1999 |
| TW | 200640202 | 11/2006 |
| TW | 200704232 | 1/2007 |
| TW | 201008148 A | 2/2010 |
| WO | 9526593 | 10/1995 |
| WO | 9818212 | 4/1998 |
| WO | 9832231 A1 | 7/1998 |
| WO | 9857452 A1 | 12/1998 |
| WO | 9857509 A2 | 12/1998 |
| WO | 9901950 A2 | 1/1999 |
| WO | 9912273 | 3/1999 |
| WO | 9923844 A2 | 5/1999 |
| WO | 9929048 | 6/1999 |
| WO | 0033528 A1 | 6/2000 |
| WO | 0035117 | 6/2000 |
| WO | 0035126 A1 | 6/2000 |
| WO | 0055992 A1 | 9/2000 |
| WO | 0062456 A1 | 10/2000 |
| WO | 0070786 A1 | 11/2000 |
| WO | 01008324 | 2/2001 |
| WO | 01017158 | 3/2001 |
| WO | 0223792 A1 | 3/2002 |
| WO | 0232003 A1 | 4/2002 |
| WO | 0233877 A1 | 4/2002 |
| WO | 02067444 A1 | 8/2002 |
| WO | 02103920 A2 | 12/2002 |
| WO | 03001834 A1 | 1/2003 |
| WO | 03017527 | 2/2003 |
| WO | 03021905 A1 | 3/2003 |
| WO | 03047124 A1 | 6/2003 |
| WO | 03067783 | 8/2003 |
| WO | 03079577 A2 | 9/2003 |
| WO | 03096635 A1 | 11/2003 |
| WO | 03105370 A1 | 12/2003 |
| WO | 2004010573 A1 | 1/2004 |
| WO | 2004025869 A2 | 3/2004 |
| WO | 2004025986 A2 | 3/2004 |
| WO | 2004032369 A2 | 4/2004 |
| WO | 2004066666 | 8/2004 |
| WO | 2004084480 A1 | 9/2004 |
| WO | 2004107768 A2 | 12/2004 |
| WO | 2004114582 A1 | 12/2004 |
| WO | 2005020464 A1 | 3/2005 |
| WO | 2005034383 A2 | 4/2005 |
| WO | 2005036913 A1 | 4/2005 |
| WO | 2005053177 A1 | 6/2005 |
| WO | 2005060192 A1 | 6/2005 |
| WO | 2006004948 | 1/2006 |
| WO | 2006071761 | 7/2006 |
| WO | 2006115979 A1 | 11/2006 |
| WO | 2007000620 A1 | 1/2007 |
| WO | 2007016553 A1 | 2/2007 |
| WO | 2007024963 | 3/2007 |
| WO | 2007029958 A1 | 3/2007 |
| WO | 2007053840 | 5/2007 |
| WO | 2007060093 A1 | 5/2007 |
| WO | 2007060229 A1 | 5/2007 |
| WO | 2008005890 | 1/2008 |
| WO | 2008012265 A1 | 1/2008 |
| WO | 2008027192 A2 | 3/2008 |
| WO | 2008156061 A1 | 12/2008 |
| WO | 2009105611 A1 | 8/2009 |
| WO | 2009108586 A2 | 9/2009 |
| WO | 2009140338 A2 | 11/2009 |
| WO | 2011028978 | 3/2011 |

OTHER PUBLICATIONS

Chunguang, W., et al., "Enhanced OTDOA Technology in 3G Location Service", Shanghai Research Institute of China Telecom, Shanghai 200122, China, Aug. 31, 2005.

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.

International Search Report and Written Opinion—PCT/US2010/047781, International Search Authority—European Patent Office—Feb. 25, 2011.

Meyr, H. et al., "Chapter 5: Synthesis of Synchronization Algorithms" and "Chapter 8: Frequency Estimation," Jan. 1, 1998, Digital Communication Receivers:Synchronization,Channel Estimation, and Signal Processing; John Wiley and Sons, Inc.: New York, pp. 271-323,445, XP002547568.

Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Olivier J.C., et al., "Single antenna interference cancellation for synchronised GSM networks using a widely linear receiver" (Feb. 1, 2007) pp. 131-136, XP006028092.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

The study of Interference Cancellation based on Multi-User Detection, Mar. 27, 2008.

Divsalar, D., et al., "Improved parallel interference cancellation for CDMA", Communications, IEEE Transactions on, Feb. 1998, vol. 46, Issue: 2, pp. 258-268.

3rd Generation Partnership, Project 2 "3GPP2" Physical Layer Standard for cdma2000, Spread Spectrum Systems. Revision D, 3GPP2 C.S0002-D, Version 2.0, Sep. 30, 2005 (538 pages).

Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2570-9.

JVT: "Draft ITU-T Recommendation and Final Draft International Standard of Joint Video Specification (ITU-T Rec. H .264 ISO/IEC 14496- 10 AVC)", 7. JVT Meeting; 64. MPEG Meeting; Jul. 3, 2003 - Mar. 13, 2003; Pattaya, TH; (Joint Video Team of ISO/IEC JTC1/SC29/WG11 and ITU-T 56.16 ), No. JVT-G050r1, Mar. 14, 2003, XP030005712, ISSN: 0000-0427.

Lakkavalli, S., et al., "Stretchable Architectures for Next Generation Cellular Networks", ISART'03, Mar. 4, 2003, 7 pages.

NTT DoCoMo: "Text proposals for detailed channel coding," 3GPP TSG-RAN WG1#7, R1-99b49, Aug. 1999, pp. 24.

"Soft Handoff and Power Control in IS-95 CDMA", CDMA95.10, Dec. 6, 1999, pp. 181-212.

Tseng, S-M., et al., Fuzzy adaptive parallel interference cancellation and vector channel prediction for CDMA in fading channels, Communications, 2002. ICC 2002. IEEE International Conference on, 2002, vol. 1, pp. 252-256.

* cited by examiner

SYMBOL ESTIMATION METHODS AND APPARATUSES

REFERENCE TO CO-PENDING APPLICATIONS FOR PATENT

The present Application for Patent is related to co-pending U.S. patent application Ser. No. 12/038,724, entitled "COHERENT SINGLE ANTENNA INTERFERENCE CANCELLATION FOR GSM/GPRS/EDGE,", filed Feb. 27, 2008, assigned to the assignee hereof, and expressly incorporated by reference herein.

The present Application for Patent is related to co-pending U.S. patent application Ser. No. 12/193,995, entitled "ENHANCED GERAN RECEIVER USING CHANNEL INPUT BEAMFORMING,", filed Aug. 19, 2008, assigned to the assignee hereof, and expressly incorporated by reference herein.

The present Application for Patent is related to co-pending U.S. patent application Ser. No. 12/478,195, entitled "ITERATIVE INTERFERENCE CANCELLATION RECEIVER,", filed Jun. 4, 2009, assigned to the assignee hereof, and expressly incorporated by reference herein.

The present Application for Patent is related to co-pending U.S. patent application Ser. No. 12/553,848, entitled "MULTI-STAGE INTERFERENCE SUPPRESSION,", filed Sep. 3, 2009, assigned to the assignee hereof, and expressly incorporated by reference herein.

BACKGROUND

1. Field

The present invention generally relates to wireless communication and, in particular, relates to refining estimation of received symbols.

2. Background

In many communication systems utilizing GSM, GPRS, EDGE or the like, a receiver's ability to properly decode a received signal depends upon the receiver's ability to accurately estimate symbols in the received signal. As wireless communications become ever more prevalent, however, increasing amounts of interference and complexity of implementation for symbol estimation can negatively impact a receiver's ability to make such symbol estimation.

SUMMARY

In an exemplary aspect, a symbol estimation method implemented at a receiver is disclosed. The method comprises calculating, based on an estimate of a communication channel and an initial estimate of a set of received symbols, a refined estimate of the set of received symbols, by performing, for each symbol in the set of received symbols, refinement operations. The refinement operations comprise parameterizing, for the symbol, a contribution to intersymbol interference (ISI) by the remaining symbols in the set of received symbols, selecting a refined estimated value for the symbol by evaluating an optimization function using the estimate of the communication channel and one or more symbol values from the initial estimate of the set of received symbols, and computing a log-likelihood value for the selected refined estimated value for the symbol based on, at least in part, the contribution of ISI by the remaining symbols in the set of received symbols and the estimate of the communication channel.

In one exemplary aspect, a symbol estimation system configured to calculate, based on an estimate of a communication channel and an initial estimate of a set of received symbols, a refined estimate of the set of received symbols is disclosed. The system comprises an intersymbol interference (ISI) parameterization module configured to parameterize, for each symbol in the set of received symbols, a contribution to ISI by the remaining symbols in the set of received symbols, a refined estimation module configured to select a refined estimated value for each symbol in the set of received symbols, an optimization module configured to evaluate an optimization function using the estimate of the communication channel and one or more symbol values from the initial estimate of the set of received symbols, and a log-likelihood module configured to compute a log-likelihood value for the selected refined estimated value for each symbol in the set of received symbols based on, at least in part, the contribution of ISI by the remaining symbols in the set of received symbols and the estimate of the communication channel.

In one exemplary aspect, a machine-readable medium comprising instructions for estimating symbols at a receiver is disclosed. The instructions comprise code for calculating, based on an estimate of a communication channel and an initial estimate of a set of received symbols, a refined estimate of the set of received symbols, by performing, for each symbol in the set of received symbols, refinement operations comprising parameterizing, for the symbol, a contribution to intersymbol interference (ISI) by the remaining symbols in the set of received symbols, selecting a refined estimated value for the symbol by evaluating an optimization function using the estimate of the communication channel and one or more symbol values from the initial estimate of the set of received symbols, and computing a log-likelihood value for the selected refined estimated value for the symbol based on, at least in part, the contribution of ISI by the remaining symbols in the set of received symbols and the estimate of the communication channel.

In one exemplary aspect, a symbol estimation apparatus, comprising means for calculating, based on an estimate of a communication channel and an initial estimate of a set of received symbols, a refined estimate of the set of received symbols, by performing, for each symbol in the set of received symbols, refinement operations comprising means for parameterizing, for the symbol, a contribution to intersymbol interference (ISI) by the remaining symbols in the set of received symbols, means for selecting a refined estimated value for the symbol by evaluating an optimization function using the estimate of the communication channel and one or more symbol values from the initial estimate of the set of received symbols, and means for computing a log-likelihood value for the selected refined estimated value for the symbol based on, at least in part, the contribution of ISI by the remaining symbols in the set of received symbols and the estimate of the communication channel is disclosed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Receivers operating in accordance with certain wireless standards, such as GERAN, often receive signals over a channel that may be characterized as a fading channel. Operation of a receiver often involves receiving a signal, extracting symbols from the received signal and demodulating the symbols to produce data bits. To help produce the data bits accurately, a receiver may also suppress (or remove) signal distortions caused by the communication channel, noise, interference from unwanted transmitters, and so on. Receivers are often designed by making assumptions about communication channels (e.g., assuming that a communication channel has a finite impulse response of a certain duration) and noise signal (e.g., assuming that noise has a white spectrum). Based on the assumptions made, a practitioner of the art may configure a receiver to suppress the signal distortions by performing channel equalization using, for example, maximum likelihood (ML) detection, decision feedback equalization (DFE), minimum least squares estimate (MLSE) and other well-known algorithms. It is known the a practitioner of the art that a maximum likelihood (ML) estimator has the potential to offer theoretically best performance. However, in practice, an ML estimator may be computationally complex.

In certain aspects, configurations of the present disclosure provide alternate channel equalization techniques that cancel interference in the received signal by performing symbol estimation by recovering symbols from the received signals using an initial estimate of a linear estimator (e.g., channel impulse response) and iteratively using a matched filter and an interference cancellation technique to derive a "local maxima" optimal solution. In certain configurations, the symbol estimation techniques may achieve performance close to an ML estimator, but at a much reduced computational complexity.

Broadly and generally speaking, in certain aspects, the present disclosure provides interference cancellation techniques that provide improvement over traditional techniques under low signal conditions (low values of signal to noise ratios). Broadly and generally speaking, in certain aspects the present disclosure provides symbol estimation methods and systems that improve receiver performance for binary as well as M-ary modulated signals. In certain configurations, the modulation scheme is be 8PSK. In certain aspects, the present disclosure provides signal reception techniques applicable to a multi-input multi-output (MIMO) channel. In certain configuration, a MIMO channel is characterized by having multiple receive antennas at a receiver configured to receive signals from multiple transmit antennas at a transmitter.

Figure 1:
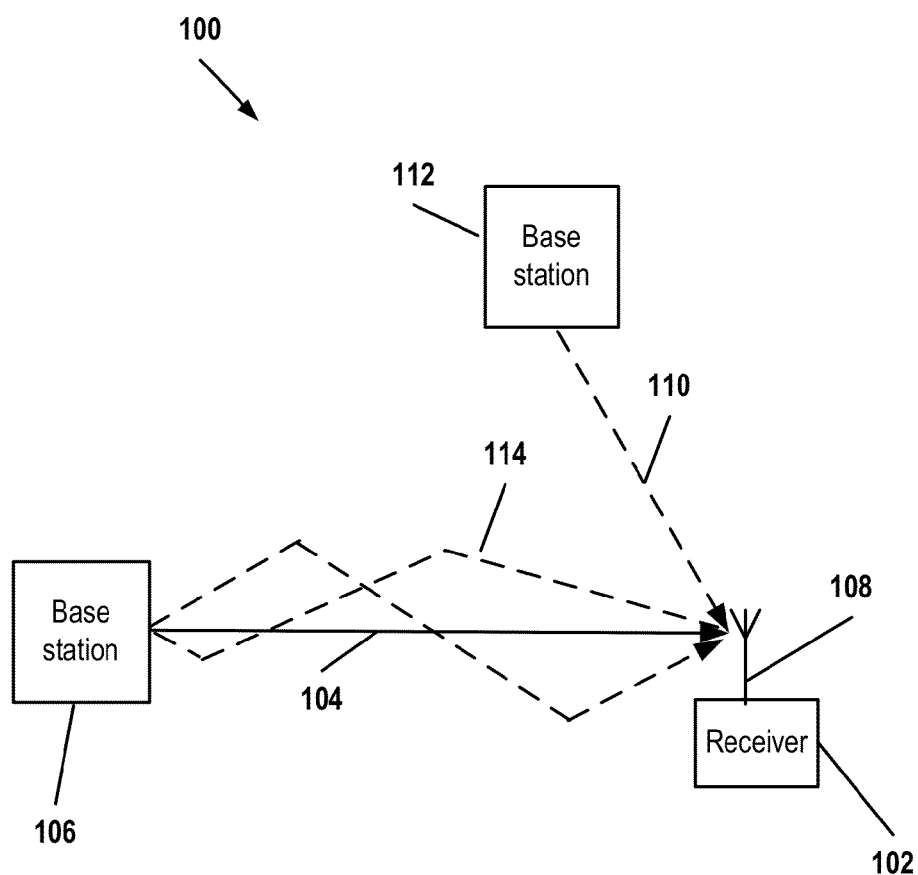
FIG. 1 illustrates an exemplary communication system in accordance with certain configurations of the present disclosure.

The following abbreviations are used throughout the present disclosure.
CCI=co-channel interference
EDGE=enhanced data rate for GSM evolution
FER=frame error rate
GERAN=GSM EDGE radio access network
GP=guard period
GSM=Global Standard for Mobile communication (Groupe Mobil Special)
IC=interference cancellation/canceller
ISI=inter-symbol interference
LLR=log-likelihood ratio
MDD=minimum distance detector
MEQ=multiple stream equalizer
MIMO=Multiple input multiple output
ML=maximum likelihood
MSIC=multiple stream inter-symbol interference cancellation
PHIC=parallel hierarchical interference cancellation
PSK=phase shift keying
RLS=recursive least squares
SER=symbol error rate
SNR=signal to noise ratio
TDMA=time domain multiple access FIG. 1 illustrates a communication system 100 in accordance with one aspect of the subject technology. The communication system 100 may, for example, be a wireless communication system based on the GSM standard. A receiver 102 receives a signal 104 transmitted by a base station 106 at an antenna 108 coupled to the receiver 102. However, as illustrated, the signal 104 may suffer from impediments such as co-channel interference (CCI), including a transmission 110 from another base station 112, and inter-symbol interference (ISI) comprising one or more reflections 114 of the signal 104. Accordingly, in certain aspects, the receiver 102 processes the signal 104 to suppress effects of CCI and ISI and recover the data transmitted by the base station 106 by estimating received symbols.

Figure 2:
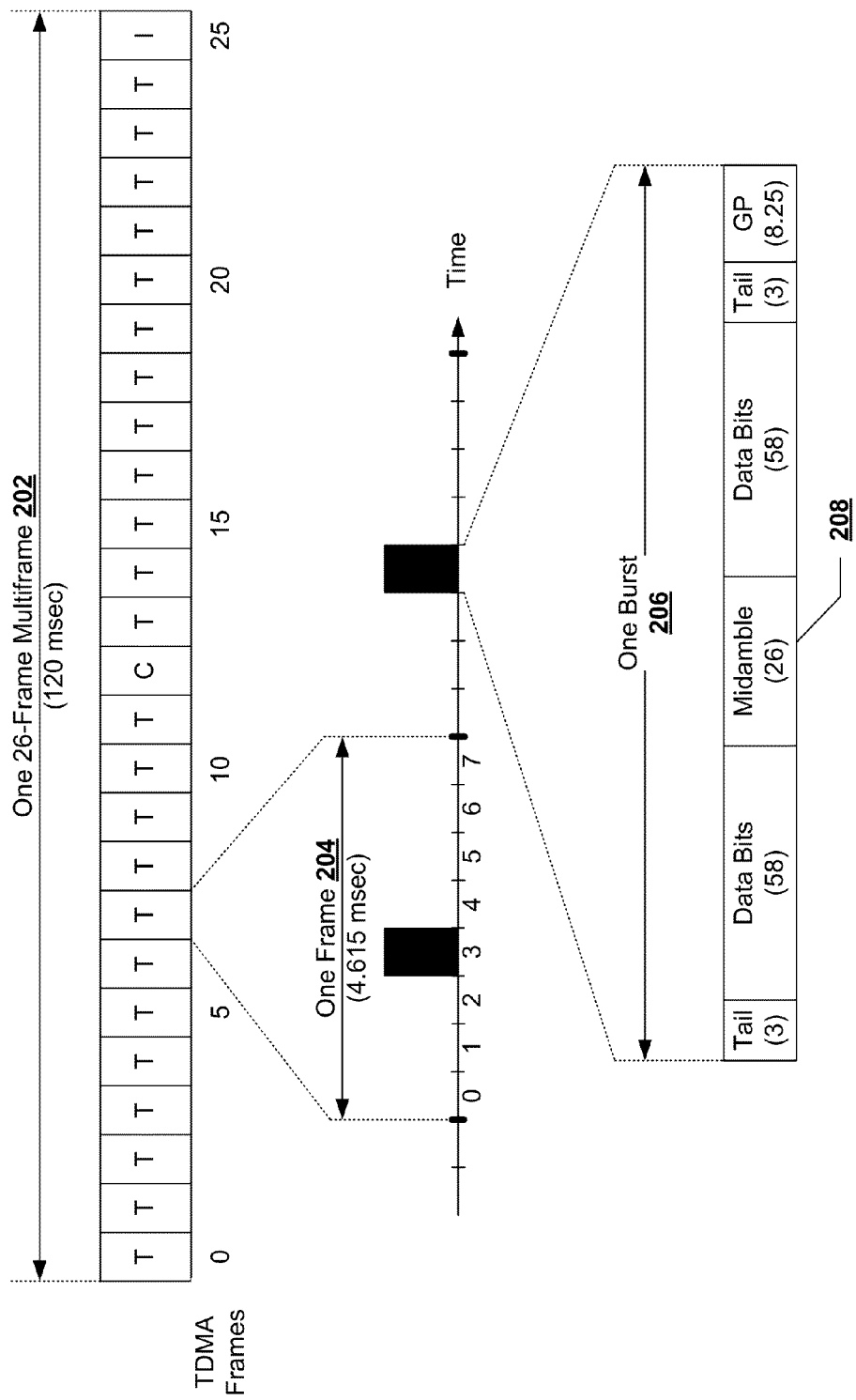
FIG. 2 is illustrates exemplary frame and burst formats in a GSM transmission, in accordance with certain configurations of the present disclosure.

FIG. 2 shows exemplary frame and burst formats in GSM. The timeline for downlink transmission is divided into multiframes. For traffic channels used to send user-specific data, each multiframe, such as exemplary multiframe 202, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 2. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 204, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 206, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 208, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

Figure 3:
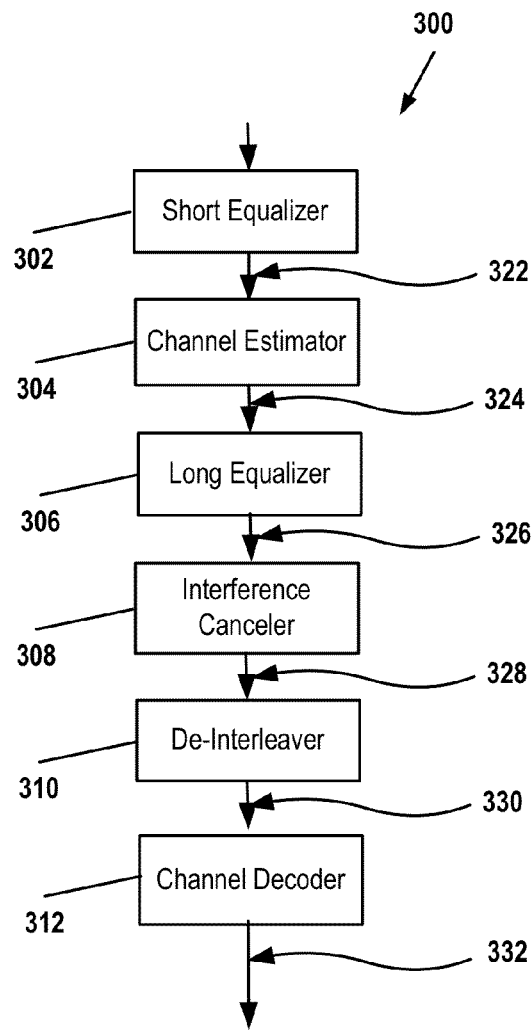
FIG. 3 is a block diagram of a receiver, in accordance with certain configurations of the present disclosure.

FIG. 3 is a block diagram of a receiver 300, in accordance with certain aspects of the present disclosure. The receiver 300 comprises a short equalizer section 302, a channel estimator section 304, a long equalizer section 306, an interference canceller section 308, an interleaver section 310 and a channel decoder section 312. The receiver 300 depicted in FIG. 3 operates as disclosed in the commonly owned and co-pending patent application Ser. No. 12/553,848, incorporated herein by reference in its entirety. The short equalizer section 302 is configured to generate a first set of equalized symbols by canceling CCI and ISI from a received burst of symbols (e.g., a midamble or a preamble). The short equalizer section 302 also generates a first estimate of the channel (e.g., impulse response coefficients) on which the received burst of symbols was received. The short equalizer section 302 uses a blind channel estimation algorithm to obtain the first estimate of the channel and calculate a first set of equalized symbols. The channel estimator section 304 is configured to use the first estimate of the channel and the first set of equalized symbols (input 322) to further estimate channel and further suppress ISI from the first set of equalized symbols and output the ISI-suppressed set of symbols (output 324). A long equalizer section 306 uses the ISI-suppressed set of symbols to further equalize the channel and suppress ISI and produce an estimate of symbols in the received set of symbol (output 326). The long equalizer section 306 also has the capability to re-estimate the channel using the ISI-suppressed set of symbols (also included in output 326). An interference canceller section 308 uses the re-estimated channel and the symbol estimates to refine the results to improve symbol decisions. The interference canceller section 308 produces symbol decisions and log-likelihood values associated with the symbol decisions (together shown as output 328). The values from the output 328 are used by further receiver sections such as a de-interleaver 310 to generate data samples 330, which are further decoded by a channel decoder 312 to produce demodulated data 332.

Still referring to FIG. 3, the interference canceller (IC) section 308, broadly speaking, operates to estimate symbols in the received signal by refining estimates of the symbols available and an estimate of the communication channel available to the IC section 308. The IC section 308 also calculates a log-likelihood for each estimated symbol and a log-likelihood ratio (LLR) for each estimated symbol. The log-likelihood and LLR values are fed to a de-interleaver stage 310, e.g., a Viterbi deinterleaver, to assist with de-interleaving. In certain configurations, the symbol estimates are calculated using a theoretically optimal algorithm such as the maximum likelihood (ML) estimator. However, implementation of an ML estimator requires searching for the best estimate for each symbol over a multi-variable search space, which can be computationally expensive, because the ML estimator often does not have the knowledge of values of any symbols.

Accordingly, in certain configurations, the symbol estimation process is simplified by parameterizing contribution to intersymbol interference from symbols $\{a_i\}$ for $i \neq k$ when estimating a symbol $a_k$. Estimation of symbol $a_k$ and corresponding log-likelihood are thus greatly simplified. Such a process is called multiple stream interface cancellation (MSIC) because, in general, the process works on multiple streams of input symbols. The process is capable of being iteratively repeated by estimating each symbol $a_i$ in each iteration, until an iteration termination criterion is met. In certain configurations, the iteration termination criterion is a measure of change to the values of the symbols $\{a_i\}$ (e.g., sum of absolute square in value changes from one iteration to the next). An improvement in error rate (e.g., frame error rate or symbol error rate) calculation is also usable as the iteration termination criterion.

To describe certain configurations in mathematical terms, let D be a positive integer representing the number of symbol streams at the input of an MSIC section. Let d be a positive integer representing channel memory per stream. To highlight certain aspects of the subject technology without obscuring with complex mathematical equations, the discussion below assumes the same value for channel memory per stream. Practitioners of the art may recognize that in general, symbol streams may be processed using different channel memory per stream. Let N represent data length for the data underlying an input signal burst.

Let $\underline{h}^i$ be a $1 \times (d+1)$ row vector representing equivalent channel impulse response for the $i^{th}$ input stream at the input of MSIC ($1 \leq i \leq D$). Let A be a $(d+1, N-d)$ matrix representing input symbols from alphabet $\{c_k\}$, where $0 \leq k \leq M-1$ and where N is a positive integer representing length of the received data. For example, for a binary input signal, the input alphabet set $\{c_k\}$ may be equal to $\{-1, +1\}$. For example, when operating in a GSM network, N may be equal to 26, corresponding to midamble 208. Similarly, for 8PSK input modulation, the alphabet set $\{c_k\}$ may have 8 members equal to $$\{e^{\frac{jk\pi}{4}}\}, k = 0, \ldots 7.$$

The relationship between the stream of input symbols $z^i$, a $1 \times (N-d)$ row vector, and the channel response $h^i$, a $1 \times (d+1)$ row vector, is represented as $\underline{z}^i = \underline{h}^i \underline{A}$ where $\underline{A}$ is a $(d+1) \times (N-d)$ matrix of received symbol estimates, represented by equation (1) below.

$$A = \begin{bmatrix} a_d & a_{d+1} & L & a_{N-1} \\ a_{d-1} & a_d & L & a_{N-2} \\ M & M & O & M \\ a_0 & a_1 & L & a_{N-1-d} \end{bmatrix} \quad (1)$$

Let the possible symbol values be represented by an alphabet set C comprising M possible symbol values, where $C=\{c_0, c_1, \ldots c_{M-1}\}$. For example, for binary modulation, an alphabet set C may comprise two values $C=\{+1, -1\}$. In certain configurations, a decision regarding value of a symbol $a_k$ at time k as being equal to one of the members of the alphabet set C may be computed using information about symbol $a_k$ contained in d+1 received symbols (d is the channel memory) and using D streams at the input of the MSIC section. The relationship can be written as:

$$\underline{z}_k^m = \begin{bmatrix} z_k^m \\ z_{k+1}^m \\ M \\ z_{k+d}^m \end{bmatrix} = \begin{bmatrix} a_k & a_{k-1} & L & a_{k-d} \\ a_{k+1} & a_k & L & a_{k-d+1} \\ M & M & O & M \\ a_{k+d} & a_{k+d-1} & L & a_k \end{bmatrix} \begin{bmatrix} h_0^m \\ h_1^m \\ M \\ h_d^m \end{bmatrix}, \quad (2)$$

where $\underline{z}_k^m$ is a (d+1)×1 column vector. Equation (2) above can be written is a matrix form as:

$$\underline{z}_k^m = A_k \underline{h}^m \quad (3a)$$

To highlight the functional dependence of the received symbol values $\underline{z}_k^m$ (at the input of the MSIC section) on the symbol value $a_k$ corresponding to the present time, and past and future symbol values and available filter estimate $\underline{h}^m$, equation (3a) can be re-written as below.

$$\underline{z}_k^m = f(a_{k-d}, \ldots, a_k \ldots a_{k+d}; \underline{h}^m) \quad (3b)$$

Therefore, likelihood of a symbol $a_k$ being $c_n$ can be written as $$p(\underline{z}_k^m | a_k = c_n) = \prod_{t=k}^{k+d} \left( \sum_{i=1, a_k}^{N_S} p(\underline{z}_t^m | a_k = c_n, X_t = \xi_{i,n}) p(X_t = \xi_{i,n}) \right) \quad (4)$$

Where $X_t = [a_t \ldots a_{t-d}]$ represents contents of a shift register at time t, $\xi_{i,n}$ is a particular realization with $a_k = c_n$, $(0 \leq n \leq M-1)$ and $N_s = M^d$, representing total number of states $X_i$ with $a_k = c_n$. As it can be seen, equation (4) implies that to estimate likelihood of a symbol $a_k$ being $c_n$, a large number of calculations may have to be performed over all possible states $X_i$. In practice, this may be prohibitively expensive to implement with regard to computational resources and computational time.

The above expression is simplified, by parameterizing contribution from other symbols to the value of the symbol $a_k$. As will be recognized by those skilled in the art, this contribution typically represents ISI due to other symbols. The parameterization is performed using values from an earlier estimate of values $\{a_k\}$ (e.g., as performed in a previous equalizer stage 306).

$$p(\underline{z}_k^m | a_k = c_n) = \prod_{t=k}^{k+d} p(\underline{z}_t^m | a_k = c_n, X_t = \xi_t^*, \underline{h}) \quad (5)$$

Equation (5) above presents a simpler expression to evaluate, because the number of unknown variables is greatly reduced. The contents of the shift register are assumed to be $X_t = \xi_t^*$, where $X_t = \xi_t^*$ represents a specific realization in which all other symbol values in the shift register are fixed to their (previously) estimated values and the contribution to the probabilistic right hand side of equation (5) is from the current symbol $a_k$. While only one symbol $a_k$ is assumed to be unknown in formulation of equation (5) above, in certain configurations, more than one symbols is assumed to be unknown. However, for the sake of clarity, results below are presented with respect to simplification where only $a_k$ is assumed to be the unknown symbol. Taking natural log of both sides followed by algebraic manipulations, one can re-write equation (5) as follows:

$$\ln p(\underline{z}_k^m | a_k = c_n) = \ln(\sqrt{2\pi} \sigma) - \frac{1}{2\sigma^2} (\underline{z}_k^m - A_k \underline{h}^m - c_n \underline{h}^m)^H \quad (6b)$$

$$(\underline{z}_k^m - A_k \underline{h}^m - c_n \underline{h}^m)$$

$$= C - \frac{1}{2\sigma^2} \begin{pmatrix} \underline{z}_k^{mH} \underline{z}_k^m + \underline{h}^{mH} A_k^H A_k \underline{h}^m + \\ c_n c_n^H \underline{h}^{mH} \underline{h}^m - \underline{z}_k^{mH} A_k \underline{h}^m - \\ \underline{h}^{mH} A_k^H \underline{z}_k^m - \underline{h}^{mH} c_n^H \underline{u}_k^m - \\ \underline{u}_k^{mH} c_n \underline{h}^m \end{pmatrix}$$

The above expression (6b) can be further simplified as terms independent of a particular symbol $c_n$, and terms that depend on the value of $c_n$.

$$= \quad (6c)$$

$$C - \frac{1}{2\sigma^2} (\text{terms\_independent\_of\_}c_n - 2\text{Re}(\underline{h}^{mH} c_n^H \underline{u}_k^m) + |c_n|^2 \underline{h}^{mH} \underline{h}^m)$$

To further simplify the expression in equation (6c), the terms independent of symbol $c_n$ do not contribute to the probabilistic nature of the symbol $a_k$ and are therefore dropped. The log-likelihood of the symbol $a_k$ being equal to $c_n$ can therefore be written as $$L^m(a_k = c_n) = \frac{\text{Re}(\underline{h}^{mH} c_n^H \underline{u}_k^m)}{\sigma^2} - \frac{|c_n|^2 \underline{h}^{mH} \underline{h}^m}{2\sigma^2}. \quad (7)$$

Equation (7) above is capable of being interpreted as a simplified log-likelihood expression for symbol $a_k$ being equal to $c_n$, by taking into consideration contribution of the $\underline{m}^{th}$ symbol stream (out of D possible symbol streams). To arrive at the result in equation (7), the parameterized symbol matrix used in equation (5) represents contribution from previous estimates of $\{a_i\}$, with term corresponding to $a_k$ set to zero:

$$A_k(\xi_t^*) = \begin{bmatrix} 0 & \hat{a}_{k-1} & L & \hat{a}_{k-d} \\ \hat{a}_{k+1} & 0 & L & \hat{a}_{k-d+1} \\ M & M & O & M \\ \hat{a}_{k+d} & \hat{a}_{k+d-1} & L & 0 \end{bmatrix}. \quad (8)$$

Additionally, an intermediate variable $u_k^m$ was introduced to simplify equation (6a) as follows:

$$u_k^m = \underline{z}_k^m - A_k(\xi_t^*) \underline{h}^m. \quad (9)$$

Therefore, according to certain aspects of the subject technology, a log-likelihood of $a_k = c_n$ by taking into consideration all D streams at the input of MSIC is expressed as:

$$L(a_k = c_n) = \sum_{m=1}^{D} \frac{\text{Re}(\underline{h}^{mH} c_n^H \underline{u}_k^m)}{\sigma^2} - \frac{|c_n|^2}{2\sigma^2} \sum_{m=1}^{D} \underline{h}^{mH} \underline{h}^m, \quad (10)$$

In certain configurations, the received signal comprises phase shift key (PSK) modulated symbols. In such configurations, all symbols have the same magnitude. Equation (10) can be simplified as:

$$L(a_k = c_n) = \sum_{m=1}^{D} \frac{\text{Re}(\underline{h}^{mH} c_n^H \underline{u}_k^m)}{\sigma^2}. \quad (11)$$

In certain configurations using binary signaling (e.g., $c_n=+1$ or $-1$), log-likelihood ratio $LLR(a_k)$ is equal to the expression $L(a_k=+1)-L(a_k=-1)$. Using the result of equation (11), the LLR for such configurations are therefore be simplified as $$LLR(a_k) = \frac{2}{\sigma^2} \sum_{m=1}^{D} \text{Re}(\underline{h}^{mH} \underline{u}_k^m). \quad (12)$$

In this manner, the log-likelihood values shown in equations (10) and (11) are relatively inexpensive to compute and may require relatively low computational resources.

The parameterization of ISI contribution by other symbols are also used to simplify a decision regarding value of $a_k$. For example, using the above results, a decision (hard decision) is made by evaluating a following optimization function:

$$\hat{a}_k = \underset{c_n}{\text{argmin}} \sum_{m=1}^{D} |\underline{h}^{mH} \underline{u}_k^m - c_n|^2 \quad (13a)$$

In this manner, equation (13a) produces results close to results produced by a maximum likelihood detector.

In some aspects, when the received signal comprises PSK modulation, the magnitude of each symbol $c_n$ is constant. Using this, when received signals are PSK modulated, the optimization function may be re-written as:

$$\hat{a}_k = \underset{c_n}{\text{argmax}} \text{Re}\left\{c_n^* \sum_{m=1}^{D} \underline{h}^{mH} \underline{u}_k^m\right\} \quad (13b)$$

Figure 4:
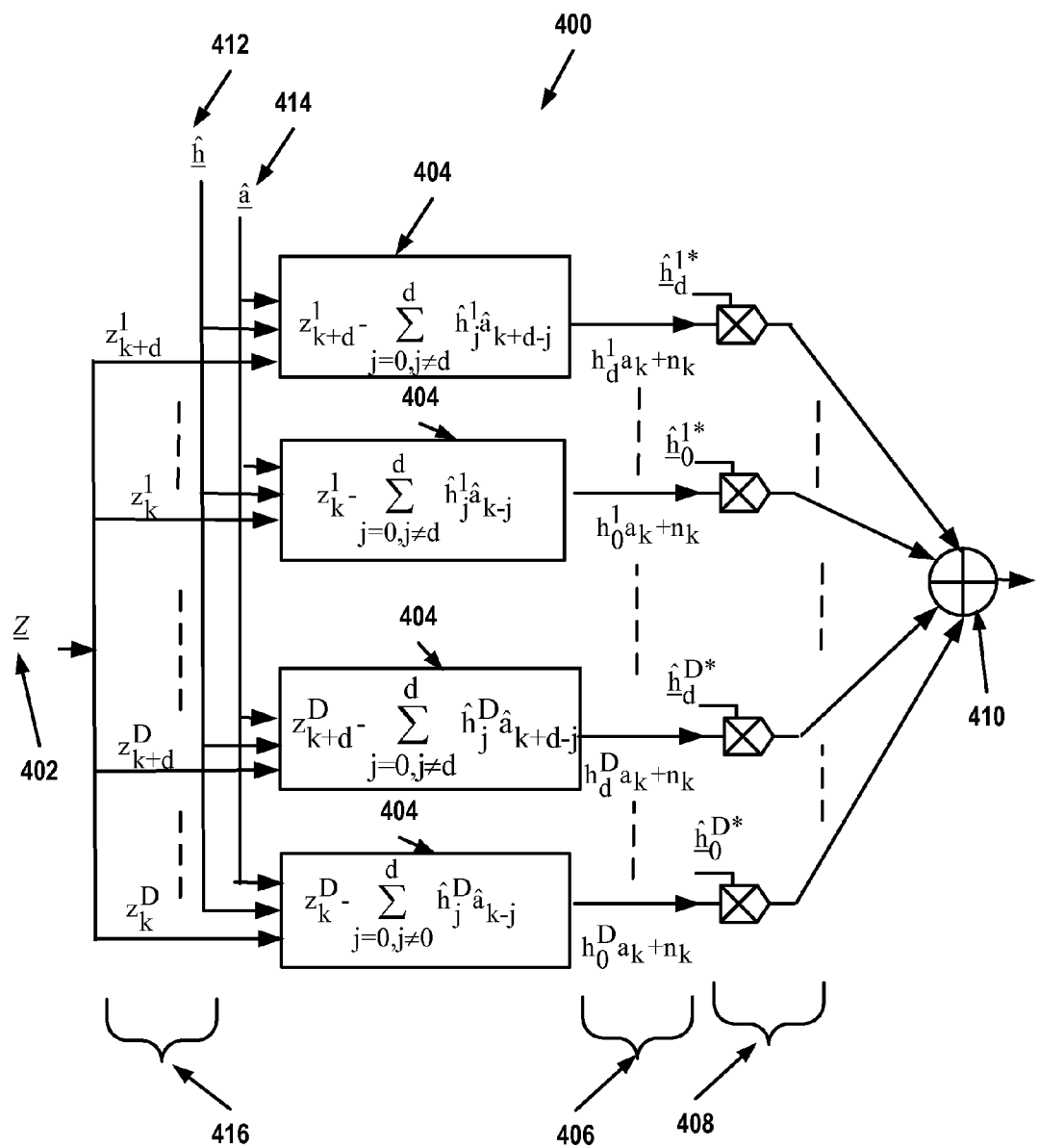
FIG. 4 is a block diagram of a multi-stream interference canceller block, in accordance with certain configurations of the present disclosure.

FIG. 4 is a block diagram of an MSIC operation 400 performed by the interference canceller 308, according to certain aspects of subject technology. The input $\underline{Z}$ 402, represents input stream values. The input $\underline{\hat{h}}$ 412 represents an initial estimate of the communication channel and the input $\underline{\hat{a}}$ 414 represents an initial estimate of a set of received symbols (including symbol $a_k$). For the sake of clarity, the input stream values $\underline{Z}$ 402 are shown separated both temporally and spatially in section 416. In the various signals shown in section 416, the superscript index corresponds to a stream index (the index having integer values from 1 to D, including both). The stream index represents a stream to which the sample is associated. The subscript index represents temporal value of the sample. Therefore, in the depicted example, at a time k, a given stream is shown to have values up to the time index k+d (d being the channel memory).

Still referring to FIG. 4, each section 404 depicts the calculation of a portion of an estimate of symbol $a_k$, at the instant k, that is generated by subtracting contribution from a set of stream samples from input $\underline{Z}$ 402, filtered through the estimated channel filter $\underline{\hat{h}}$ 412. The output of each section 404, collectively shown as elements 406, therefore represents a portion of estimate of the symbol $a_k$, scaled by a corresponding channel impulse response coefficient, plus noise $n_k$. The noise $n_k$ represents contribution from channel noise and from computational inaccuracies from any previous computational sections. No particular assumptions are made about statistics of the noise $n_k$. Each output 406 is then multiplied by a complex conjugate of the estimated filter coefficient (multipliers 408). In one aspect, the multiplication helps match the total power of the interference-cancelled symbol values with the input symbol values. The results of all the multiplications 408 are added in a sum section 410 to produce a refined estimate of the symbol $a_k$.

Figure 5:
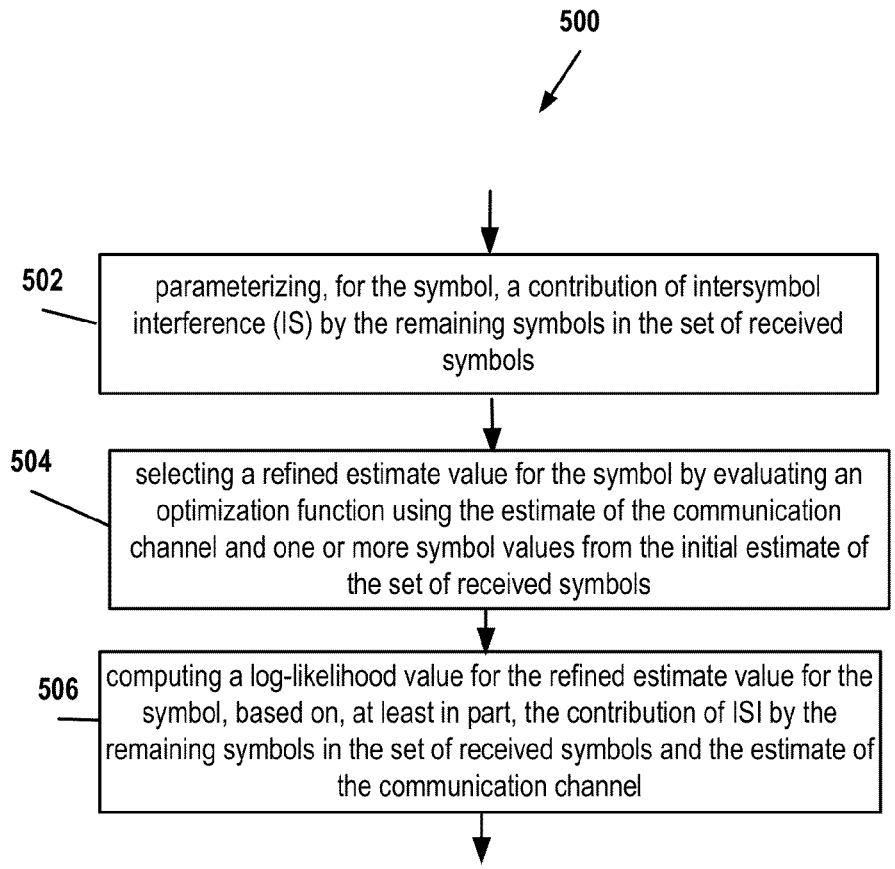
FIG. 5 illustrates a flow chart of a symbol estimation process, in accordance with certain configurations of the present disclosure.

FIG. 5 illustrates a flow chart of operations of a process 500 of symbol estimation, in accordance with certain configurations of the present disclosure. The process 500 of FIG. 5 includes an operation 502 of parameterizing, for the symbol, a contribution of intersymbol interference (ISI) by the remaining symbols in the set of received symbols. The process 500 also includes an operation 504 of selecting a refined estimated value for the symbol by evaluating an optimization function using the estimate of the communication channel and one or more symbol values from the initial estimate of the set of received symbols. The process 500 further includes an operation 506 of computing a log-likelihood value for the refined estimated value for the symbol based on, at least in part, the contribution of ISI by the remaining symbols in the set of received symbols and the estimate of the communication channel.

In certain configurations the process 500 further includes an operation (not shown in FIG. 5) of iteratively improving the refined estimate of the set of received symbols by using an output refined estimate of the set of received symbols of an iteration as the initial estimate of the set of received symbols for a next iteration, until an iteration termination criterion is met.

Figure 6:
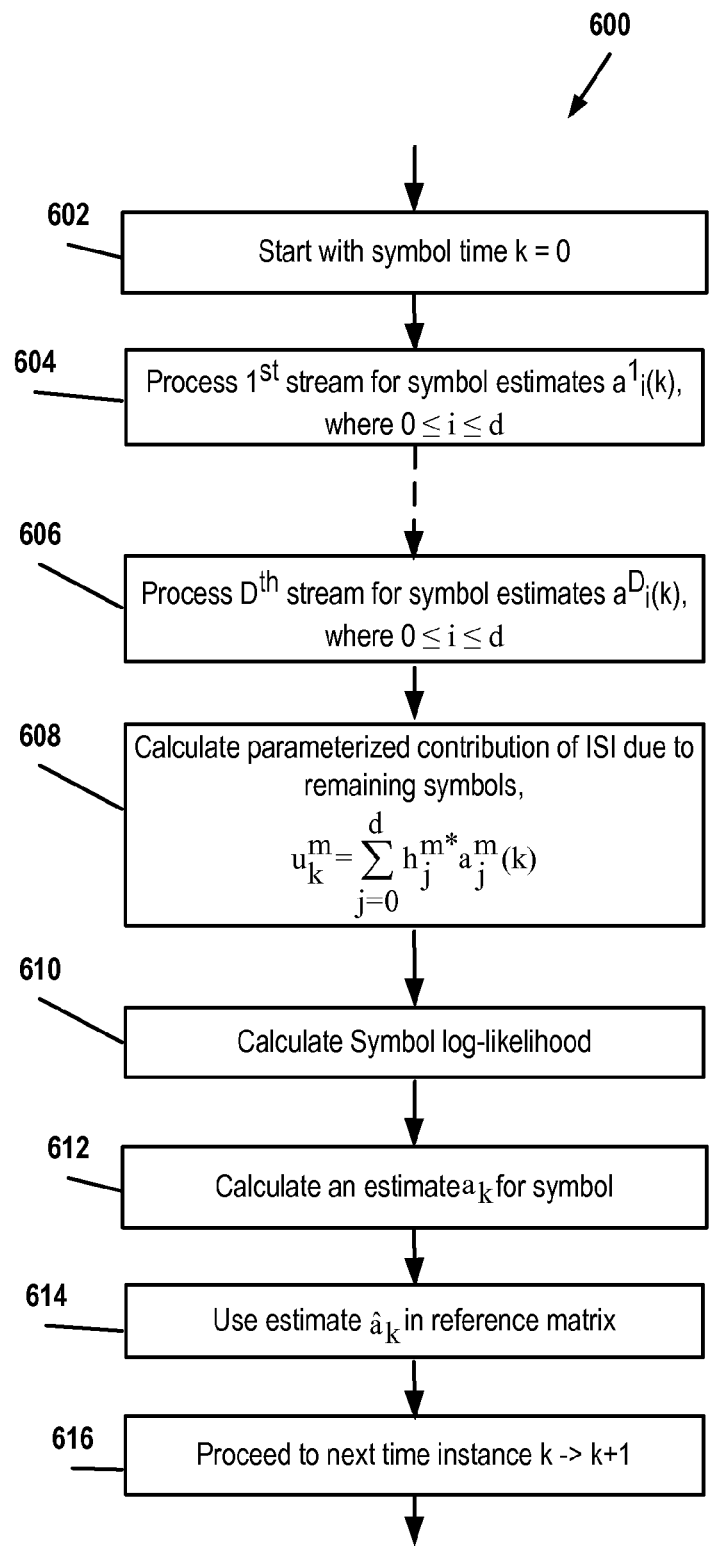
FIG. 6 illustrates a flow chart of a multi-channel symbol estimation process, in accordance with certain configurations of the present disclosure.

FIG. 6 is a flow chart illustrating a process 600 of interference cancellation, in accordance with certain aspects of the subject technology may be implemented. The process 600 is seen to include an operation 602 at which computations starts at a symbol tike k=0. The process 600 also includes operation 604 at which a first stream for symbol estimates $a_i^1(k)$, where $0 \le i \le d$ is processed, The process 600 also includes additional D−1 operations similar to process 604 such that at the last operation 606, symbol estimates $a_i^D(k)$, where $0 \le i \le d$ are processed. In an $i^{th}$ operation 604, the d symbol values are evaluated as $$a_0^i(k) = z_k^i - h_1^i \hat{a}(k-1) - h_2^i \hat{a}(k-2) \ldots -h_d^i \hat{a}(k-d), \text{to}$$

....

$$a_d^i(k) = z_{k+d}^i - h_0^i \hat{a}(k+d) - h_1^i \hat{a}(k+d-1) \ldots -h_{d-1}^i \hat{a}(k+1)$$

The process 600 further includes operation 608 at which parameterized contribution of ISI due to remaining symbols (symbols other than $a_k$) is calculated. In one aspect of the present technology, the parameterized contribution is calculated as explained previously with respect to equation (9) above, re-written as equation (14) below.

$$u_k^m = \sum_{j=0}^{d} h_j^{m*} a_j^m(k) \quad (14)$$

The process 600 further comprises an operation 610 of calculating log-likelihood for each refined symbol estimate. The operation 610 is performed using, for example, equations (10) or (11), if PSK modulation is employed. The process 600 further includes operation 612 at which an estimate $\hat{a}_k$ is calculated for a symbol $a_k$. The estimate (also called hard decision) is calculated by evaluating an expression such as given in equations (13a) or (13b). Once a hard decision $\hat{a}_k$ is made for the value of symbol $a_k$, this calculated value $\hat{a}_k$ is used for subsequent symbol estimation, including, for example, value in the matrix shown in equation (1).

A variety of optimization functions are usable for the hard symbol decision, including, for example, the optimization functions shown in equations (13 a) and 13(b). For equations (13a) or (13b), the optimization function F( ) is represented as $$F(x)=x, \quad (15a)$$

indicating that the value calculated using equations (13a) or (13b) is itself used as the optimization function in making a hard decision for the symbol $a_k$. Several other choices of optimization function are possible, consistent with certain aspects of the present disclosure. For example, in certain configurations, the optimization function is a minimum distance detector, as represented by equation (15b).

$$F(x)=MDD(x) \quad (15b)$$

In certain configurations, the function is a hyperbolic tangent function, represented by equation (15c) below. In one aspect, the function given in equation (15c) is suitable when the input symbols can take on one of two possible values only, as is well known in the art.

$$F(x) = \tanh\left(\frac{x}{2}\right) \quad (15c)$$

Figure 7:
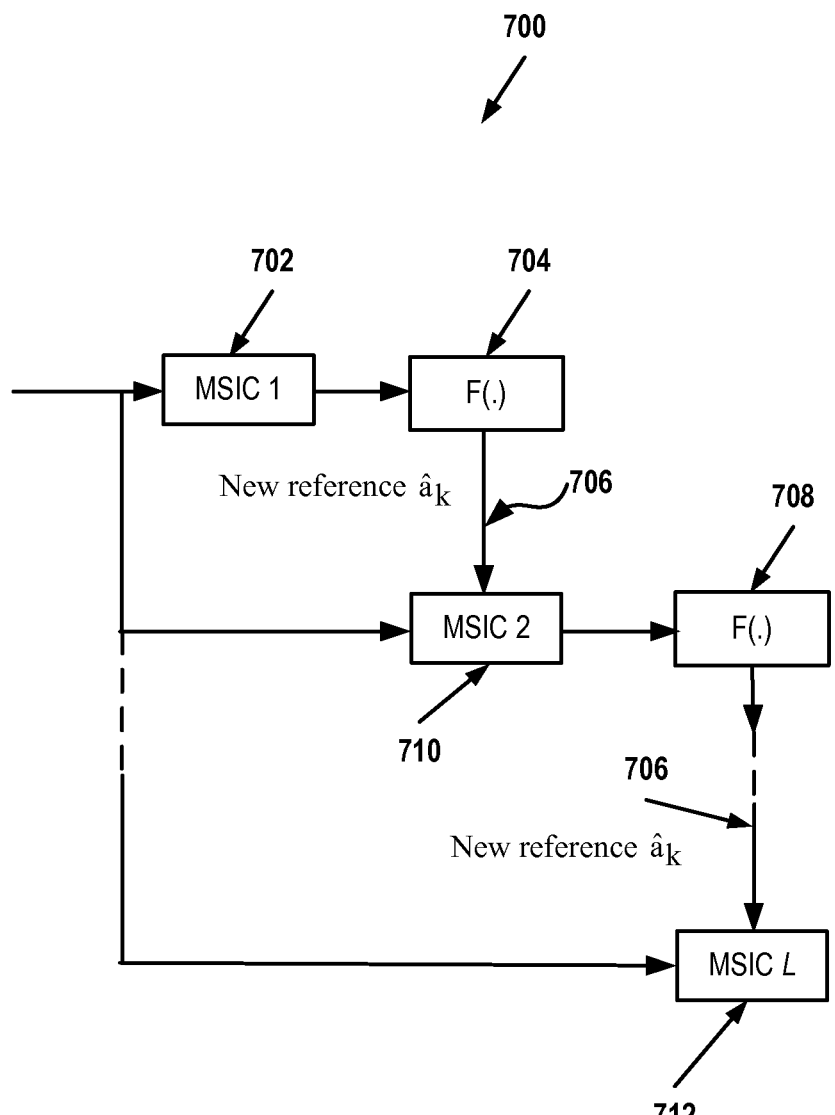
FIG. 7 illustrates a flow chart of an iterative multi-channel symbol estimation process, in accordance with certain configurations of the present disclosure.

FIG. 7 depicts a block diagram illustrating an iterative implementation 700 of symbol estimation, in accordance with certain configurations of the present disclosure. The first iteration comprises an MSIC section 702, followed by an optimization function section 704 that generates a symbol decision by evaluating an optimization function as discussed with respect to equations (15a)-(15c) above. The symbol decisions 706 from the function section 704 are used as input to the MSIC section 710 for the next iteration. The MSIC section 710 is followed by the optimization function section 708. Output symbol decisions 706 from the function section are used as input to the next MSIC section, and so on. The implementation 700 is terminated after L iterations. Each iteration (e.g., sections 702 and 704) is also referred to as a parallel hierarchical interference cancellation (PHIC) stage. The value L for the last MSIC iteration can either be fixed a priori, or can be decided during run time, by evaluating an iteration termination criterion. For example, in certain configurations, at the end of each iteration (e.g., sections 708, 710), a determination is made regarding improvement achieved by the new symbol estimates. The improvement is evaluated in terms of magnitude of changes to estimates $\hat{a}_k$ (e.g. $L_1$, $L_2$ or $L_\infty$ norm). In other aspects, the improvement is evaluated in terms of FER or SER as a result of the new symbol estimates, and whether the improvement over the previous estimates was above a predetermined threshold. For example, in certain configurations, iterations is terminated if the improvement in a next iteration corresponds to less than 0.2 dB SNR.

Figure 8:
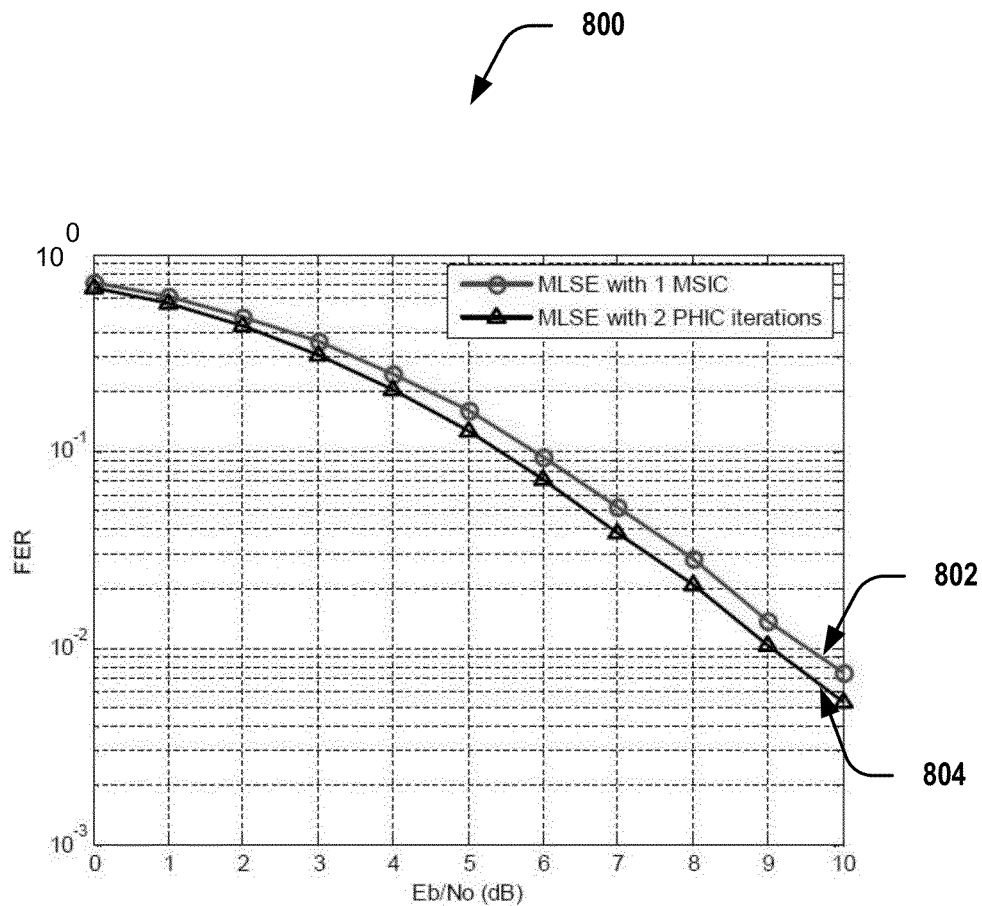
FIG. 8 is a chart illustrating frame error rate performance improvements achievable utilizing various aspects of the subject technology, in accordance with certain configurations of the present disclosure.

FIG. 8 is a chart 800 illustrating exemplary performance achievable in accordance with certain configurations of the subject technology. Chart 800 depicts the frame error rate over a range of signal energy to noise energy ratios (Eb/No) for exemplary receiver systems operating on GSM TU50 communication channel. As can be seen in chart 800, performance in a second iteration 804 improves over performance after a first iteration 802 by close to one-half dB Eb/No.

Figure 9:
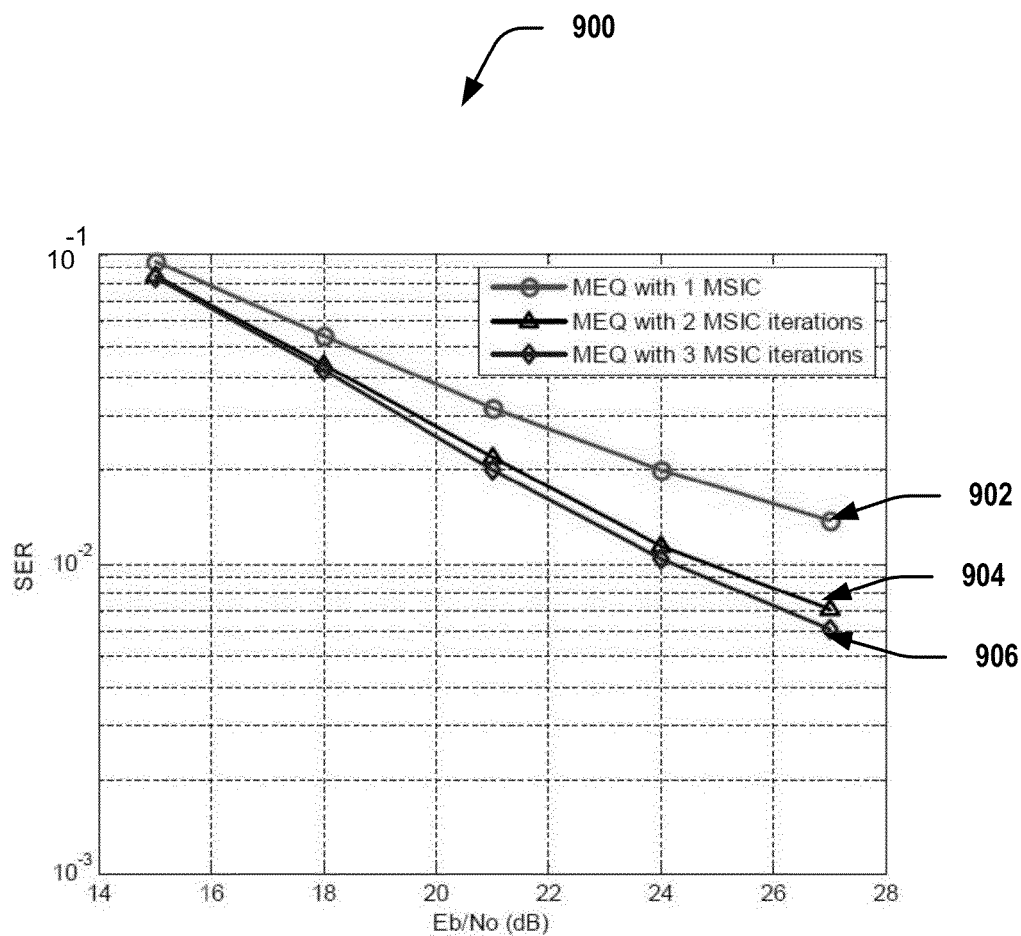
FIG. 9 is a chart illustrating symbol error rate performance improvements achievable utilizing various aspects of the subject technology, in accordance with certain configurations of the present disclosure.

FIG. 9 is a chart 900 illustrating exemplary performance achievable in accordance with certain configurations of the subject technology. Chart 900 depicts the symbol error rate over a range of signal energy to noise energy ratios (Eb/No) for exemplary receiver systems operating on an EDGE HT100 communication channel using 8PSK modulation. As can be seen in chart 900, performance in a second iteration 904 and a third iteration 906 improves over performance after a first iteration 902 by several dB Eb/No. As can further be seen in chart 900, performance improvement by successive iterations of symbol estimates gives marginally diminishing improvements.

Figure 10:
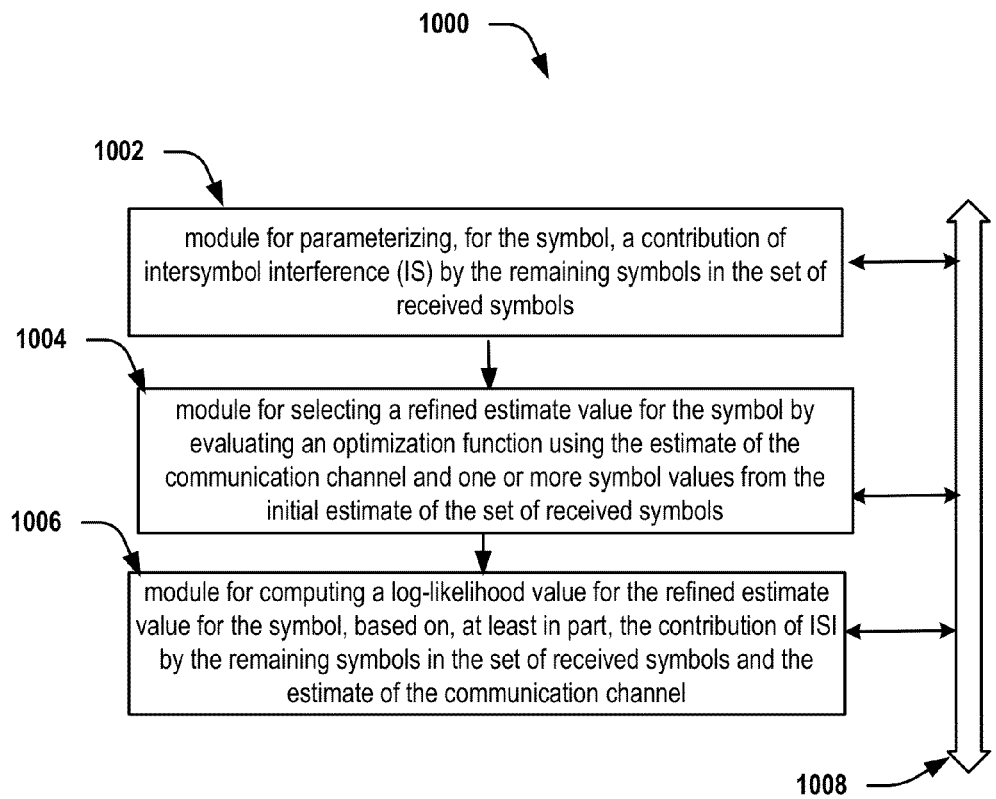
FIG. 10 is a block diagram illustrating a receiver apparatus, in accordance with certain configurations of the present disclosure.

FIG. 10 is a block diagram that illustrates exemplary receiver apparatus 1000 in accordance with certain configurations of the subject technology. The receiver apparatus 1000 comprises means 1002 for parameterizing, for the symbol, a contribution of intersymbol interference (IS) by the remaining symbols in the set of received symbols, means 1004 for selecting a refined estimate value for the symbol by evaluating an optimization function using the estimate of the communication channel and one or more symbol values from the initial estimate of the set of received symbols and means 1006 for computing a log-likelihood value for the refined estimate value for the symbol, based on, at least in part, the contribution of ISI by the remaining symbols in the set of received symbols and the estimate of the communication channel. As depicted in FIG. 10, means 1002, 1004 and 1006 are in communication with each other via a communication means 1008.

Figure 11:
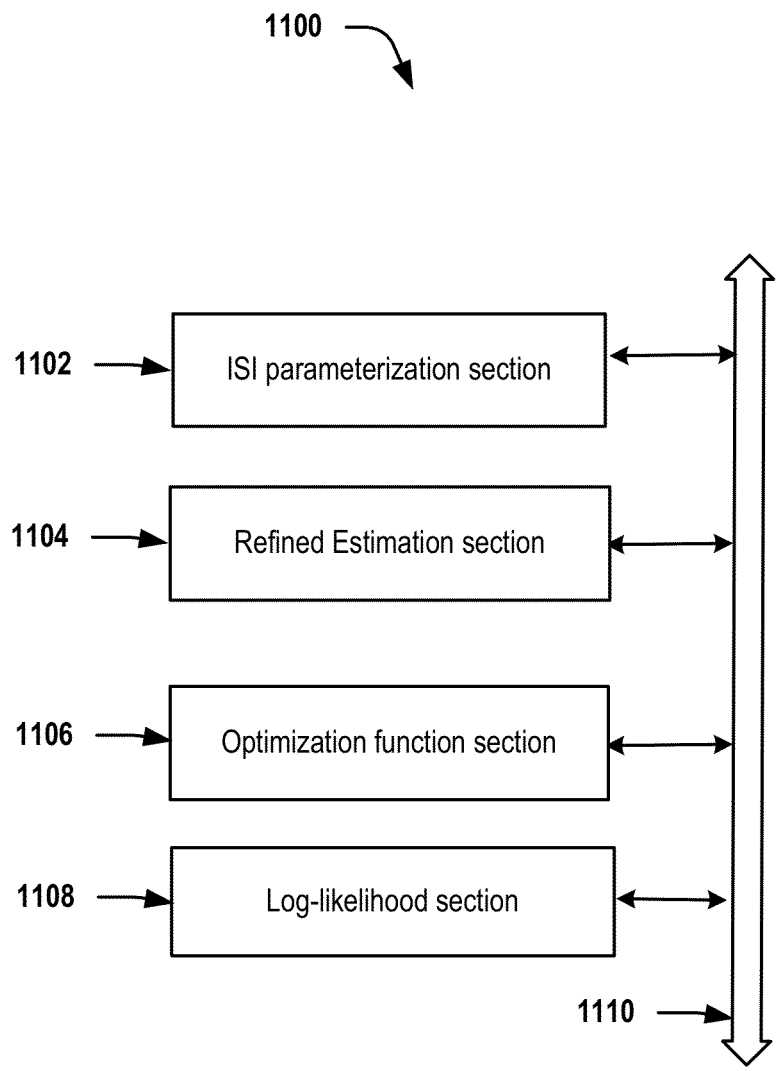
FIG. 11 is a block diagram illustrating a symbol estimation system, in accordance with certain configurations of the present disclosure.

FIG. 11 is a block diagram that illustrates exemplary receiver system 1100 in accordance with certain configurations of the subject technology. The receiver system 1100 comprises an ISI parameterization module 1102 configured for parameterizing, for the symbol, a contribution of intersymbol interference (IS) by the remaining symbols in the set of received symbols. The receiver system 1100 further comprises a Refined Estimation module 1104 configured for selecting a refined estimate value for the symbol by evaluating an optimization function using the estimate of the communication channel and one or more symbol values from the initial estimate of the set of received symbols. The receiver system 1100 further comprises an optimization function module 1106 configured for providing symbol estimates by evaluating an optimization function. The receiver system 1100 further comprises a log-likelihood module 1108 configured for computing a log-likelihood value for the refined estimate value for the symbol, based on, at least in part, the contribution of ISI by the remaining symbols in the set of received symbols. As depicted in FIG. 11, the modules 1102, 1104, 1106 and 1108 are in communication via a communication module 1110.

Figure 12:
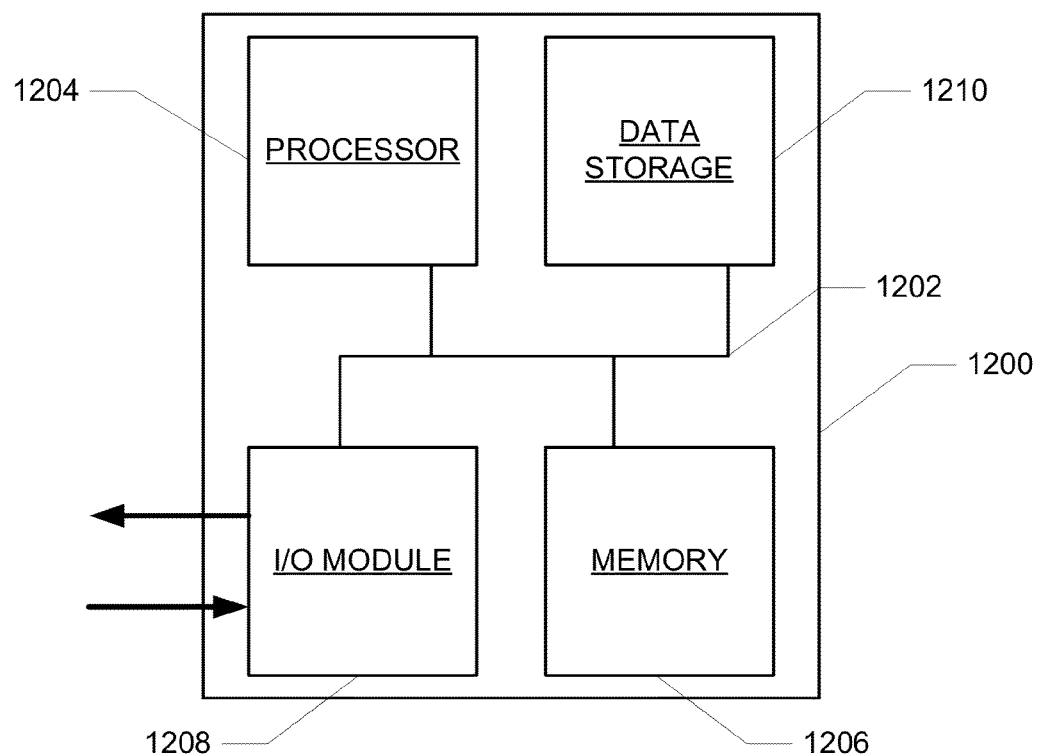
FIG. 12 is a block diagram illustrating a computer system with which certain aspects of the subject technology may be implemented in accordance with certain configurations of the present disclosure.

FIG. 12 is a block diagram that illustrates a computer system 1200 upon which an aspect may be implemented. Computer system 1200 includes a bus 1202 or other communication mechanism for communicating information, and a processor 1204 coupled with bus 1202 for processing information. Computer system 1200 also includes a memory 1206, such as a random access memory ("RAM") or other dynamic storage device, coupled to bus 1202 for storing information and instructions to be executed by processor 1204. Memory 1206 can also be used for storing temporary variable or other intermediate information during execution of instructions to be executed by processor 1204. Computer system 1200 further includes a data storage device 1210, such as a magnetic disk or optical disk, coupled to bus 1202 for storing information and instructions.

Computer system 1200 may be coupled via I/O module 1208 to a display device (not illustrated), such as a cathode ray tube ("CRT") or liquid crystal display ("LCD") for displaying information to a computer user. An input device, such as, for example, a keyboard or a mouse may also be coupled to computer system 1200 via I/O module 1208 for communicating information and command selections to processor 1204.

According to one aspect, interference suppression is performed by a computer system 1200 in response to processor 1204 executing one or more sequences of one or more instructions contained in memory 1206. Such instructions may be read into memory 1206 from another machine-readable medium, such as data storage device 1210. Execution of the sequences of instructions contained in main memory 1206 causes processor 1204 to perform the process steps described herein. One or more processors in a multi-processing arrangement may also be employed to execute the sequences of instructions contained in memory 1206. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to a processor for execution. Such a medium may take many forms, including, but not limited to, non-volatile media, volatile media, and transmission media. Non-volatile media include, for example, optical or magnetic disks, such as a data storage device. Volatile media include dynamic memory. Transmission media include coaxial cables, copper wire, and fiber optics, including the wires that comprise a bus connecting processors and memory sections. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In one aspect, the present disclosure provides a symbol estimation method that is computationally more efficient compared to traditional approaches. In one aspect, contribution to intersymbol interference by other symbols is parameterized for estimating a given symbol from a received signal. In one aspect, the parameterization advantageously reduces the space of unknown variables over which to perform search in estimating a log-likelihood value for a symbol decision. In one aspect, performance can be improved by iteratively refining estimates of symbols.

Those of skill in the art would appreciate that the various illustrative sections, modules, elements, components, methods, and algorithms described herein may be implemented as electronic hardware, computer software, or combinations of both. Furthermore, these may be partitioned differently than what is described. To illustrate this interchangeability of hardware and software, various illustrative sections, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or sections in the processes disclosed is an illustration of exemplary approaches. Based upon design preferences, it is understood that the specific order or hierarchy of steps or sections in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A symbol estimation method implemented at a receiver, comprising:

calculating, based on an estimate of a communication channel and an initial estimate of a set of received symbols, a refined estimate of the set of received symbols, by performing, for each symbol in the set of received symbols, refinement operations comprising:

parameterizing, for the symbol, a contribution to intersymbol interference (ISI) by the remaining symbols in the set of received symbols;

selecting a refined estimated value for the symbol by evaluating an optimization function using the estimate of the communication channel and one or more symbol values from the initial estimate of the set of received symbols; and computing a log-likelihood value for the selected refined estimated value for the symbol based on, at least in part, the contribution of ISI by the remaining symbols in the set of received symbols and the estimate of the communication channel;

wherein the set of receive symbols comprise two possible values and wherein, in the refinement operation of selecting the refined estimate value, the evaluating the optimization function comprises evaluating a hyperbolic tan function.

2. The method according to claim 1, further comprising: iteratively improving the refined estimate of the set of received symbols by using an output refined estimate of the set of received symbols of an iteration as the initial estimate of the set of received symbols for a next iteration, until an iteration termination criterion is met.

3. The method according to claim 1, wherein each symbol in the initial estimate of the set of received symbols has an equal value.

4. The method according to claim 1, wherein the refinement operations further comprise:
generating a log-likelihood estimate for the refined estimated value.

5. The method according to claim 1, wherein the set of received symbols comprises one or more symbols from a known set of symbols.

6. The method according to claim 5, wherein the known set of symbols comprises a midamble.

7. The method of claim 1, wherein, in the refinement operation of selecting the refined estimate value, the evaluating the optimization function comprises evaluating a soft decision.

8. The method of claim 1, wherein, in the refinement operation of selecting the refined estimate value, the evaluating the optimization function comprises evaluating a minimum distance function.

9. The method of claim 6, further comprising providing the log-likelihood estimate to a Viterbi decoder.

10. The method of claim 1, wherein the contribution of ISI by the remaining symbols comprises an output of a filtering of the remaining symbols through a filter comprising the estimate of the communication channel.

11. The method according to claim 1, wherein the estimate of the communication channel is computed using one or more symbols from the set of received symbols using a blind channel estimation algorithm.

12. The method according to claim 1, wherein the initial estimate of the set of received symbols is computed using one or more symbols from the set of received symbols using a blind channel estimation algorithm.

13. A symbol estimation system configured to calculate, based on an estimate of a communication channel and an initial estimate of a set of received symbols, a refined estimate of the set of received symbols, the system comprising:
an intersymbol interference (ISI) parameterization module configured to parameterize, for each symbol in the set of received symbols, a contribution to ISI by the remaining symbols in the set of received symbols;
a refined estimation module configured to select a refined estimated value for each symbol in the set of received symbols;
an optimization module configured to evaluate an optimization function using the estimate of the communication channel and one or more symbol values from the initial estimate of the set of received symbols; and
a log-likelihood module configured to compute a log-likelihood value for the selected refined estimated value for each symbol in the set of received symbols based on, at least in part, the contribution of ISI by the remaining symbols in the set of received symbols and the estimate of the communication channel;
wherein the set of receive symbols comprise two possible values and wherein the optimization module is configured to evaluate a hyperbolic tan function.

14. The system according to claim 13, further comprising:
an iterative interference cancellation module configured to iteratively improve the refined estimate of the set of received symbols by using an output refined estimate of the set of received symbols of an iteration as the initial estimate of the set of received symbols for a next iteration, until an iteration termination criterion is met.

15. The system according to claim 13, wherein each symbol in the initial estimate of the set of received symbols has an equal value.

16. The system according to claim 13, further comprising:
a log-likelihood estimation module configured to generate a log-likelihood estimate for the refined estimated value.

17. The system according to claim 13, wherein the set of received symbols comprises one or more symbols from a known set of symbols.

18. The system according to claim 17, wherein the known set of symbols comprises a midamble.

19. The system according to claim 13, wherein the optimization module is configured to evaluate a soft decision.

20. The system according to claim 13, wherein the optimization module is configured to evaluate a minimum distance function.

21. The system according to claim 18, wherein the log-likelihood module is further configured to provide the log-likelihood value to a Viterbi decoder.

22. The system according to claim 13, wherein the ISI parameterization module is further configured to calculate an output of a filtering of the remaining symbols through a filter comprising the estimate of the communication channel.

23. The system according to claim 13, wherein the estimate of the communication channel is computed using one or more symbols from the set of received symbols using a blind channel estimation algorithm.

24. The system according to claim 13, wherein the initial estimate of the set of received symbols is computed using one or more symbols from the set of received symbols using a blind channel estimation algorithm.

25. A non-transitory machine-readable medium comprising instructions for estimating symbols at a receiver, the instructions comprising code for:
calculating, based on an estimate of a communication channel and an initial estimate of a set of received symbols, a refined estimate of the set of received symbols, by performing, for each symbol in the set of received symbols, refinement operations comprising:
parameterizing, for the symbol, a contribution to intersymbol interference (ISI) by the remaining symbols in the set of received symbols;
selecting a refined estimated value for the symbol by evaluating an optimization function using the estimate of the communication channel and one or more symbol values from the initial estimate of the set of received symbols; and
computing a log-likelihood value for the selected refined estimated value for the symbol based on, at least in part, the contribution of ISI by the remaining symbols in the set of received symbols and the estimate of the communication channel;
wherein the set of receive symbols comprise two possible values and wherein the code for selecting the refined estimate value comprises code for evaluating a hyperbolic tan function.

26. The non-transitory machine-readable medium according to claim 25, wherein the instructions further comprise code for:

iteratively improving the refined estimate of the set of received symbols by using an output refined estimate of the set of received symbols of an iteration as the initial estimate of the set of received symbols for a next iteration, until an iteration termination criterion is met.

27. The non-transitory machine-readable medium according to claim 25, wherein each symbol in the initial estimate of the set of received symbols has an equal value.

28. The non-transitory machine-readable medium according to claim 25, wherein the code for performing the refinement operations further comprises code for:
generating a log-likelihood estimate for the refined estimated value.

29. The non-transitory machine-readable medium according to claim 25, wherein the set of received symbols comprises one or more symbols from a known set of symbols.

30. The non-transitory machine-readable medium according to claim 25, wherein the known set of symbols comprises a midamble.

31. The non-transitory machine-readable medium according to claim 25, wherein the code for selecting the refined estimate value for the symbol comprises code for evaluating a soft decision.

32. The non-transitory machine-readable medium according to claim 25, wherein the code for selecting the refined estimate value comprises code for evaluating a minimum distance function.

33. The non-transitory machine-readable medium according to claim 30, wherein the instructions further comprise code for providing the log-likelihood estimate to a Viterbi decoder.

34. The non-transitory machine-readable medium according to claim 25, wherein the code for calculating a contribution of ISI by the remaining symbols comprises code for calculating an output of a filtering of the remaining symbols through a filter comprising the estimate of the communication channel.

35. The non-transitory machine-readable medium according to claim 25, wherein the estimate of the communication channel is computed using one or more symbols from the set of received symbols using a blind channel estimation algorithm.

36. The non-transitory machine-readable medium according to claim 25, wherein the initial estimate of the set of received symbols is computed using one or more symbols from the set of received symbols using a blind channel estimation algorithm.

37. A symbol estimation apparatus, comprising:
means for calculating, based on an estimate of a communication channel and an initial estimate of a set of received symbols, a refined estimate of the set of received symbols, by performing, for each symbol in the set of received symbols, refinement operations comprising:
means for parameterizing, for the symbol, a contribution to intersymbol interference (ISI) by the remaining symbols in the set of received symbols;
means for selecting a refined estimated value for the symbol by evaluating an optimization function using the estimate of the communication channel and one or more symbol values from the initial estimate of the set of received symbols; and
means for computing a log-likelihood value for the selected refined estimated value for the symbol based on, at least in part, the contribution of ISI by the remaining symbols in the set of received symbols and the estimate of the communication channel;
wherein the set of receive symbols comprise two possible values and wherein, in the means for performing refinement operation of selecting the refined estimate value, the means for evaluating the optimization function comprises means for evaluating a hyperbolic tan function.

38. The apparatus according to claim 37, further comprising:
means for iteratively improving the refined estimate of the set of received symbols by using an output refined estimate of the set of received symbols of an iteration as the initial estimate of the set of received symbols for a next iteration, until an iteration termination criterion is met.

39. The apparatus according to claim 37, wherein each symbol in the initial estimate of the set of received symbols has an equal value.

40. The apparatus according to claim 37, wherein the means for performing the refinement operations further comprises:
means for generating a log-likelihood estimate for the refined estimated value.

41. The apparatus according to claim 37, wherein the set of received symbols comprises one or more symbols from a known set of symbols.

42. The apparatus according to claim 41, wherein the known set of symbols comprises a midamble.

43. The apparatus according to claim 37, wherein, in the means for performing refinement operation of selecting the refined estimate value, the means for evaluating the optimization function comprises means for evaluating a soft decision.

44. The apparatus according to claim 37, wherein, in the means for performing refinement operation of selecting the refined estimate value, the means for evaluating the optimization function comprises means for evaluating a minimum distance function.

45. The apparatus according to claim 42, further comprising means for providing the log-likelihood estimate to a Viterbi decoder.

46. The apparatus according to claim 37, wherein the contribution of ISI by the remaining symbols comprises an output of the filtering of the remaining symbols through a filter comprising the estimate of the communication channel.

47. The apparatus according to claim 37, wherein the estimate of the communication channel is computed using one or more symbols from the set of received symbols using a blind channel estimation algorithm.

48. The apparatus according to claim 37, wherein the initial estimate of the set of received symbols is computed using one or more symbols from the set of received symbols using a blind channel estimation algorithm.

* * * * *